United States Patent
Katagiri et al.

(10) Patent No.: US 8,304,129 B2
(45) Date of Patent: Nov. 6, 2012

(54) SOLID ELECTROLYTE FUEL CELL INCLUDING A FIRST CATHODE LAYER AND A SECOND CATHODE LAYER

(75) Inventors: Fumimasa Katagiri, Nagano (JP); Shigeaki Suganuma, Nagano (JP); Yasue Tokutake, Nagano (JP); Jun Yoshiike, Nagano (JP); Michio Horiuchi, Nagano (JP)

(73) Assignee: Shinko Electric Industries Co., Ltd., Nagano-shi, Nagano (JP)

( * ) Notice: Subject to any disclaimer, the term of this patent is extended or adjusted under 35 U.S.C. 154(b) by 1167 days.

(21) Appl. No.: 11/727,520

(22) Filed: Mar. 27, 2007

(65) Prior Publication Data
US 2007/0238007 A1 Oct. 11, 2007

(30) Foreign Application Priority Data
Mar. 30, 2006 (JP) .............. P.2006-094432

(51) Int. Cl.
*H01M 8/10* (2006.01)
(52) U.S. Cl. ......... 429/482; 429/400; 429/405; 429/479
(58) Field of Classification Search .......... None
See application file for complete search history.

(56) References Cited

U.S. PATENT DOCUMENTS

| | | | |
|---|---|---|---|
| 4,135,040 A | 1/1979 | Thornton | |
| 5,364,711 A * | 11/1994 | Yamada et al. | 429/470 |
| 5,591,537 A * | 1/1997 | Bagger et al. | 429/482 |
| 6,316,138 B1 | 11/2001 | Satake et al. | |
| 2003/0162067 A1 * | 8/2003 | McElroy | 429/26 |
| 2004/0214080 A1 * | 10/2004 | O'Neil et al. | 429/128 |
| 2004/0265663 A1 * | 12/2004 | Badding et al. | 429/30 |
| 2005/0092597 A1 | 5/2005 | O'Neil et al. | |
| 2005/0249993 A1 | 11/2005 | Horiuchi et al. | |
| 2006/0040168 A1 * | 2/2006 | Sridhar | 429/40 |
| 2006/0260952 A1 * | 11/2006 | Mazur et al. | 205/668 |
| 2007/0026289 A1 * | 2/2007 | Horiuchi et al. | 429/40 |

FOREIGN PATENT DOCUMENTS

| | | |
|---|---|---|
| EP | 0 615 299 | 9/1994 |
| EP | 0 510 820 B1 | 1/1996 |
| GB | 2 400 723 | 10/2004 |
| JP | 3-134963 | 6/1991 |
| JP | 2005-63686 | 3/2005 |
| JP | 2005-235549 | 9/2005 |

\* cited by examiner

*Primary Examiner* — Ula C Ruddock
*Assistant Examiner* — Tony Chuo
(74) *Attorney, Agent, or Firm* — Drinker Biddle & Reath LLP

(57) ABSTRACT

A solid electrolyte fuel cell comprising a cathode layer 12 formed on one side of a solid electrolyte layer 10 and an anode layer 18 formed on the other side of the solid electrolyte layer 10, wherein the cathode layer 16 comprises a first cathode layer 12 formed in contact with the solid electrolyte layer and a second cathode layer 14 formed covering the first cathode layer 12, the second cathode layer 14 is formed having a higher porosity than the first cathode layer 12 and the first cathode layer 12 is divided into a plurality of island-shaped portions 12a, 12a.

13 Claims, 12 Drawing Sheets

SOLID ELECTROLYTE FUEL CELL INCLUDING A FIRST CATHODE LAYER AND A SECOND CATHODE LAYER

BACKGROUND OF THE INVENTION

The present invention relates to a solid electrolyte fuel cell and a process for the production thereof and more particularly to a solid electrolyte fuel cell comprising a cathode layer formed on one side of a solid electrolyte layer and an anode layer formed on the other side of the solid electrolyte layer and a process for the production thereof.

Patent Reference 1 cited below proposes a simple fuel cell which can be disposed in a burning flame or in the vicinity thereof to generate electricity. This fuel cell is shown in FIG. 13. A fuel cell 100 shown in FIG. 13 comprises a cathode layer 104 formed on one side of a solid electrolyte layer 102 having a dense structure and an anode layer 110 formed on the other side of the solid electrolyte layer 102 (hereinafter referred to as "solid electrolyte fuel cell 100"). The cathode layer 104 and the anode layer 110 each are in the form of porous layer and have mesh metals 106, 112 embedded therein or fixed thereto. From these mesh metals 106, 112 extend lead wires 103, 114.

[Patent Reference 1] JP-A-2005-63686

When the solid electrolyte fuel cell 100 shown in FIG. 13 is disposed in or in the vicinity of burning flame on the anode layer 110 side thereof, electricity can be generated and outputted at the lead wires 108, 114.

However, when the solid electrolyte fuel cell 100 shown in FIG. 13 is repeatedly exposed to flame (thermal shock) on the anode layer side 110 thereof, there occurs a phenomenon that the electric power (shown by the solid circle in FIG. 14) outputted at the lead wires 108, 114 shows a gradual drop as shown by the arrow A in FIG. 14 illustrating the electricity-generating properties of the solid electrolyte fuel cell 100, demonstrating that the solid electrolyte fuel cell 100 is poor in durability. Further, the electric power outputted at the lead wires 108, 114 is insufficient. Therefore, the solid electrolyte fuel cell 100 shown in FIG. 13 leaves something to be desired in durability and electric power outputted.

In FIG. 14, the blank circle indicates voltage outputted at the lead wires 108, 114.

In order to study the reason why the solid electrolyte fuel cell 100 shown in FIG. 13 is poor in durability, the inventors observes electron-microphotographically a section of the solid electrolyte fuel cell 100 which is repeatedly exposed to flame on the anode layer 110 side thereof. As a result, it is found as shown in FIG. 15 that the interface of the porous cathode layer 104 with the solid electrolyte layer 102 having a dense structure undergoes exfoliation and the solid electrolyte layer 102 undergoes cracking.

It is further observed that the adhesion between the metal wire constituting the mesh metal embedded in the cathode layer 104 and the cathode layer 104 is deteriorated.

SUMMARY OF THE INVENTION

Therefore, an aim of the invention is to provide a solid electrolyte fuel cell having an enhanced durability capable of providing an enhanced electric power when disposed in or in the vicinity of burning flame on the anode layer side thereof to generate electricity.

The present inventors makes extensive studies of solution to the aforementioned problems. As a result, it is found that when the cathode layer is a two-layer structure comprising a first cathode layer formed in contact with a solid electrolyte layer and a second cathode layer formed covering the first cathode layer wherein the second cathode layer is formed having a higher porosity than the first cathode layer and the first cathode layer is divided into a plurality of island-shaped portions, the electric power which can be withdrawn from the solid electrolyte fuel cell and the durability of the solid electrolyte fuel cell can be enhanced. The invention is thus worked out.

In other words, according to the invention, there is provided a solid electrolyte fuel cell including: a solid electrolyte layer, a cathode layer formed on one side of the solid electrolyte layer and an anode layer formed on the other side of the solid electrolyte layer, wherein the cathode layer includes a first cathode layer formed in contact with the solid electrolyte layer and a second cathode layer formed covering the first cathode layer, the second cathode layer has a higher porosity than the first cathode layer and the first cathode layer is divided into a plurality of island-shaped portions.

In the solid electrolyte fuel cell according to the invention, the plurality of island-shaped portions constituting the first cathode layer are periodically formed. In this arrangement, the width of the gap between the island-shaped portions can be made constant, making it possible to render the durability of the various island-shaped portions, etc. constant. By filling the gap between the island-shaped portions with a molding material constituting the second cathode layer, the output of the solid electrolyte fuel cell can be further enhanced.

Further, the surface of the solid electrolyte layer on the cathode layer side thereof is periodically roughened to have a roughened surface, the roughened portion has island-shaped portions constituting the first cathode layer disposed on the recessed side thereof and the gap between the island-shaped portions disposed on the raised side thereof. In this arrangement, island-shaped portions constituting the first cathode layer can be easily formed. By forming, on the surface of a first roughened portion in which a recessed portion corresponding to island-shaped portions provided thereon and a raised portion having the gap between the island-shaped portions provided thereon occur in turn periodically, a second roughened portion having a lower period than the first roughened portion formed on the first roughened portion, the peel strength between the island-shaped portions and the solid electrolyte layer can be further enhanced.

By providing a metal wire constituting a current collecting mesh metal or linear metal embedded in or fixed to the second cathode layer for each of the island-shaped portions constituting the first cathode layer, the output of the solid electrolyte fuel cell can be enhanced.

Further, preferably, the porosity of the first cathode layer is 10 vol-% or less and the porosity of the second cathode layer is 50 vol-% or more.

The second cathode layer having a porosity falling within the above defined range can be obtained by adding a pore-forming material gasified at the calcining temperature of the cathode layer during the calcining thereof, and the first cathode layer can be obtained by calcining without adding the pore-forming material. The added amount of the pore-forming material to be incorporated herein is preferably from 50 to 70 vol-%.

By forming the first cathode layer and the second cathode layer including an electrolyte constituting the solid electrolyte layer and an electrode material incorporated therein in admixture, the difference in thermal expansion coefficient between the first cathode layer and second cathode layer and the solid electrolyte layer can be reduced as much as possible.

In particular, by making the mixing proportion of the solid electrolyte in the first cathode layer be higher than the second cathode layer, the heat resistance of the solid electrolyte fuel cell can be further enhanced.

When the solid electrolyte fuel cell is exposed to flame on one side thereof in the open atmosphere to generate electricity, the solid electrolyte fuel cell is exposed to flame on the anode layer side thereof and open to the atmosphere on the cathode layer side thereof, making it possible to generate electricity.

According to the invention, there is provided a method for producing a solid electrolyte fuel cell, including the steps of: laminating a first cathode sheet having an electrode material for cathode layer incorporated therein on one side of a solid electrolyte layer, laminating a second cathode sheet having the electrode material for cathode layer and a pore-forming material incorporated therein on the first cathode sheet, laminating an anode sheet having an electrode material for anode layer incorporated therein on the other side of the solid electrolyte layer, and calcining the first cathode sheet, the second cathode sheet and anode sheet at a temperature at which the pore-forming material is gasified to form a first cathode layer, a second cathode layer and an anode layer, wherein before or during the calcining, the first cathode sheet is divided into a plurality of island-shaped portions to form a first cathode layer including a plurality of island-shaped divisions on one side of the solid electrolyte layer.

In the method for producing a solid electrolyte fuel cell according to the invention, the surface of one side of the solid electrolyte layer having a first cathode sheet laminated thereon has a roughened portion formed thereon having a recessed portion corresponding to island-shaped portions constituting the first cathode layer obtained by calcining the first cathode sheet and a raised portion corresponding to the gap between the island-shaped portions, the recessed portion and the raised portion occurring in turn periodically, whereby the island-shaped portions constituting the first cathode layer can be easily formed. Thus, the island-shaped portions can be periodically formed.

Further, the solid electrolyte layer there has two kinds of roughened portions having different periods to have a roughened surface on the surface on which the first cathode sheet is laminated, wherein the two kinds of roughened portions are composed of: a first roughed portion in which a recessed portion corresponding to island-shaped portions constituting the first cathode layer obtained by calcining the first cathode sheet and a raised portion corresponding to the gap between the island-shaped portions occur in turn periodically, and a second roughened portion formed on the surface of the first roughed portion and having a lower period than the first roughened portion. In this arrangement, the adhesion between the island-shaped portions constituting the first cathode layer and the solid electrolyte layer can be further enhanced.

The aforementioned solid electrolyte layer can be easily formed by pressing a fabric made of an organic fiber or metallic fiber against at least one side of a green sheet for solid electrolyte constituting the solid electrolyte layer, so that a first roughened portion having a period in which a recessed portion and a raised portion occur in turn periodically is formed on the one surface of the green sheet by the crossing of weft and warp constituting the fabric and a second roughened portion having a lower period than the first roughened portion is formed on the surface of the first roughened portion by the single fiber constituting the weft and warp, and calcining the green sheet for solid electrolyte.

The gap between the island-shaped portions constituting the first cathode layer can be filled with a molding material for forming the second cathode layer by laminating a first cathode sheet on one side of a solid electrolyte layer having a recessed portion corresponding to island-shaped portions constituting a first cathode layer obtained by calcining the first cathode sheet and a raised portion corresponding to the gap between the island-shaped portions occur in turn periodically, subjecting the first cathode sheet to tentative calcining so that the plurality of island-shaped portions constituting the first cathode layer are each formed in the recessed portion constituting the roughened portion of the solid electrolyte layer, laminating a second cathode sheet on the top of the first cathode layer and an anode sheet on the other side of the solid electrolyte layer, and subjecting the first cathode layer and the second cathode sheet and the anode sheet to calcining.

Further, a metal wire constituting a current collecting mesh metal or linear metal can be provided for each of the island-shaped portions constituting the first cathode layer, if a current collecting mesh metal or linear metal is embedded in or fixed to the second cathode sheet or anode sheet, and as the mesh metal or linear metal, a mesh metal or linear metal has a metal wire provided therein in correspondence to the island-shaped portions constituting the first cathode layer obtained by calcining the first cathode sheet.

Moreover, if the amount of the pore-forming material to be incorporated in the second sheet is from 50 to 70 vol-%, it is possible to make the porosity of the first cathode layer and the second cathode layer be 10 vol-% or less and 50 vol-% or more, respectively.

Further, if the first cathode sheet and the second cathode sheet have an electrolyte constituting the solid electrolyte layer and an electrode material incorporated therein in admixture, respectively, the difference in thermal expansion coefficient between the first cathode layer and second cathode layer and the solid electrolyte layer can be reduced as much as possible. In particular, by making the mixing proportion of the solid electrolyte in the first cathode layer be greater than the second cathode layer, the heat resistance of the solid electrolyte fuel cell can be further enhanced.

In accordance with the solid electrolyte fuel cell according to the invention, when the solid electrolyte fuel cell is disposed in or in the vicinity of burning flame to generate electricity, the electric power which can be withdrawn from the solid electrolyte fuel cell of the invention and the durability of the solid electrolyte fuel cell of the invention can be enhanced. The reason for this mechanism can be thought as follows.

Firstly, in the solid electrolyte fuel cell according to the invention, the cathode layer comprises a first cathode layer formed in contact with the solid electrolyte layer and a second cathode layer formed covering the first cathode layer and having a high porosity than the first cathode layer. The second cathode layer has a current collecting mesh metal or linear metal embedded therein or fixed thereto. In this arrangement, when this cathode layer is formed by calcining, the difference in thermal properties between the electrode material constituting the cathode layer and the mesh metal or linear metal can be relaxed by the presence of pores, making it possible to enhance the adhesion between the mesh metal or linear metal and the electrode material.

Further, the first cathode layer is divided into a plurality of island-shaped portions. Therefore, in the case where the solid electrolyte fuel cell is disposed in or in the vicinity of burning flame on the anode layer side thereof to generate electricity, the stress due to the difference in thermal expansion coefficient between the first cathode layer and the solid electrolyte layer can be dispersed, making it possible to prevent the exfoliation of the island-shaped portions constituting the first cathode layer and the solid electrolyte layer from each other.

Moreover, in the solid electrolyte fuel cell according to the invention, the area of three phase boundary at which the gas such as oxygen, the electrode material and the electrolyte material come in contact with each other can be raised.

Further, in the solid electrolyte fuel cell according to the invention, the second cathode layer has a higher porosity than the first cathode layer. In this arrangement, oxygen ions can easily conduct to the solid electrolyte layer on the interface of the first cathode layer with the solid electrolyte layer.

Thus, the combined effect of the enhancement of adhesion between the mesh metal or linear metal and the electrode material, the prevention of exfoliation of the island-shaped portions constituting the first cathode layer and the solid electrolyte layer from each other, the increase of three phase zone at which the gas such as oxygen, the electrode material and the electrolyte material come in contact with each other and the facilitation of conduction of oxygen ions to the solid electrolyte layer on the interface of the first cathode layer with the solid electrolyte layer makes it possible for the solid electrolyte fuel cell according to the invention to output a higher electric power than the related art solid electrolyte fuel cells and exhibit an enhanced durability.

DETAILED DESCRIPTION OF THE PREFERRED EMBODIMENTS

Figure 1:
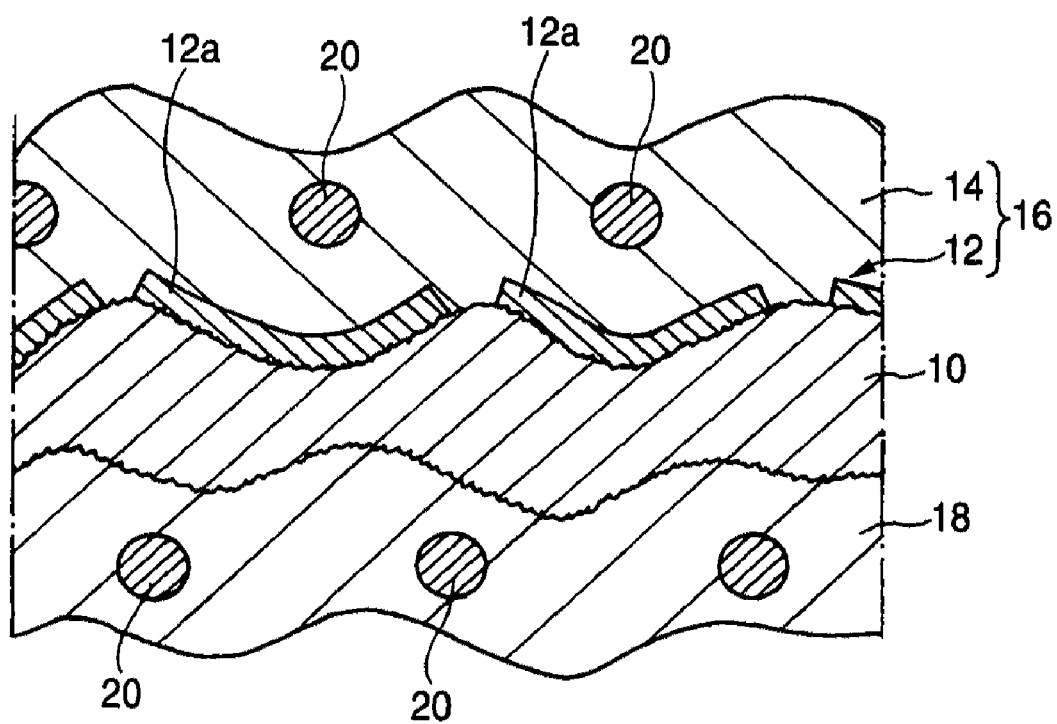
FIG. 1 is a partial sectional view illustrating an example of the solid electrolyte fuel cell according to the invention.

An example of the solid electrolyte fuel cell according to the invention is shown in FIG. 1. FIG. 1 is a partial sectional view of the solid electrolyte fuel cell. A solid electrolyte layer 10 comprises a cathode layer 16 provided on one side thereof having platinum metal wires 20, 20 . . . constituting a current collecting mesh metal embedded therein and an anode layer 18 provided on the other side thereof having platinum metal wires 20, 20 . . . constituting a current collecting mesh metal embedded therein.

The solid electrolyte layer 10 is a dense structure. As the solid electrolyte constituting the solid electrolyte layer 10 there may be used any known solid electrolyte. Examples of the solid electrolyte employable herein include YSZ (yttria-stabilized zirconia), ScSZ (scandia-stabilized zirconia), zirconia-based ceramics obtained by doping these zirconia with Ce, Al, etc., and ceria-based ceramics such as SDC (samaria-doped ceria) and GDC (gadolia-doped ceria), and LSGM (lanthanum gallate) etc.

The solid electrolyte layer 10 shown in FIG. 1 has two roughened portions having different periods to have a roughened surface. The two roughened portions are composed of a first roughened portion having a high period and a second roughened portion formed on the surface of the first roughened portion having a lower period than the first roughened portion.

The cathode layer 16 formed on one side of the solid electrolyte layer 10 has a two-layer structure composed of a first cathode layer 12 provided in contact with one side of the solid electrolyte layer 10 and a second cathode layer 14 provided covering the first cathode layer 12 and having platinum metal wires 20, 20 . . . constituting a current collecting mesh metal embedded therein. The second cathode layer 14 has a higher porosity than the first cathode layer 12. In some detail, while the first cathode layer 12 is a dense layer having a porosity of 10 vol-% or less, the second cathode layer 14 is a porous layer having a porosity of 50 vol-% or more (preferably 70 vol-% or less).

As the electrode material for cathode layer constituting the cathode layer 16, too, there may be used any known electrode material for cathode layer. Examples of the electrode material for cathode layer employable herein include manganate compounds (e.g., lanthanum strontium manganite etc.), cobaltate compounds (e.g., samarium strontium cobaltite, lanthanum strontium cobaltite etc.) or ferrite compounds (e.g., lanthanum strontium ferrite etc.) of element belonging to the group III such as lanthanum having strontium (Sr) incorporated therein.

When the first cathode layer 12 and the second cathode layer 14 constituting the cathode layer 16 each are formed by mixing an electrode material for cathode layer and an electrolyte constituting the solid electrolyte layer 10, the difference in thermal expansion coefficient between the cathode layer 16 and the solid electrolyte layer 10 can be reduced as much as possible, making it possible to prevent the exfoliation of the solid electrolyte layer 10 and the cathode 16 from each other.

In particular, the predetermination of the mixing proportion of electrolyte in the first cathode layer 12 disposed in close contact with the solid electrolyte layer 10 among the first cathode layer 12 and the second cathode layer 14 to be more than that of the second cathode layer 14 makes it possible to form the cathode layer 16 as an electrolyte gradient layer and further enhance the heat resistance of the solid electrolyte fuel cell.

The second cathode layer 14 can be formed by sheet-forming a porous layer paste obtained by mixing a predetermined amount of a cathode electrode material and an electrode with a pore-forming material, and then calcining the mixture at not lower than a temperature at which the pore-forming material can be gasified. As the pore-forming material there is preferably used a carbon-based pore-forming material.

The first cathode layer 12 can be obtained by sheet-forming a dense layer paste obtained by mixing a predetermined amount of a cathode layer electrode material and an electrolyte free of pore-forming material, and then calcining the mixture at a predetermined temperature.

Further, in the solid electrolyte fuel cell shown in FIG. 1, the first cathode layer 12 is divided into a plurality of island-shaped portions 12*a*, 12*a* . . . . In this arrangement, the stress due to the difference in thermal expansion coefficient between the solid electrolyte layer 10 and the first cathode layer 12 can be dispersed. Thus, combined with the effect of the second roughened portion having a low period formed on one side of the solid electrolyte layer 10, this arrangement makes it possible to prevent the exfoliation of the solid electrolyte layer 10 and the first cathode layer 12 from each other.

The various island-shaped portions 12*a*, 12*a* . . . constituting the first cathode layer 12 are each disposed on the recessed side of the first roughened portion having a high period formed on one side of the solid electrolyte layer 10 and the gap between the island-shaped portion 12*a* and the island-shaped portion 12*a* is disposed on the raised side of the first roughened portion. Accordingly, the island-shaped portions 12*a*, 12*a* . . . can be formed in substantially the same size and the gap between the island-shaped portions 12*a*, 12*a* . . . can be substantially the same. The width of gap between the island-shaped portions 12*a*, 12*a* . . . depends on the size of the island-shaped portions 12*a* but is preferably from about 10 μm to 100 μm.

Metal wires 20 made of platinum constituting a current collecting mesh metal are provided in the second cathode layer 14 in correspondence to the island-shaped portions 12*a*, 12*a* . . . respectively.

As the electrode material for anode layer constituting the anode layer 18 on the other side of the solid electrolyte layer 10 there may be used any known electrode material for anode layer. Examples of the electrode material for anode layer employable herein include cermets of nickel and cobalt with yttria-stabilized zirconia-based ceramics, scandia-stabilized zirconia-based ceramics or ceria-based (e.g., SDC, GDC, YDC) ceramics. As the electrode material for anode layer there may be also used a sintered material comprising as a main component (50 to 99% by weight) an electrically-conductive oxide. As the electrically-conductive oxide there may be used nickel oxide having lithium solidly dissolved therein or the like. This sintered material has an excellent oxidation resistance, making it possible to prevent the occurrence of phenomena due to oxidation of the anode layer 18 such as drop of electricity generating efficiency or incapability of generating electricity caused by the rise of resistivity of electrode of the anode layer 18 and exfoliation of the anode layer 18 from the solid electrolyte layer 10. Further, an electrode material for anode layer obtained by incorporating a metal such as platinum group element or oxide thereof in the aforementioned electrode material for anode layer in an amount of from about 1 to 10% by weight, too, can form an anode layer 18 having high electricity-generating properties.

When the aforementioned anode layer 18, too, is formed by mixing an electrode material for anode layer and an electrolyte, the difference in thermal expansion coefficient between the anode layer 18 and the solid electrolyte layer 10 can be reduced as much as possible, making it possible to prevent the exfoliation of the solid electrolyte layer 10 and the anode layer 18 from each other.

The anode layer 18 can be formed by sheet-forming an anode layer paste obtained by mixing a predetermined amount of an electrode material for anode layer and an electrolyte, and then calcining the mixture at a predetermined temperature.

Figure 2:
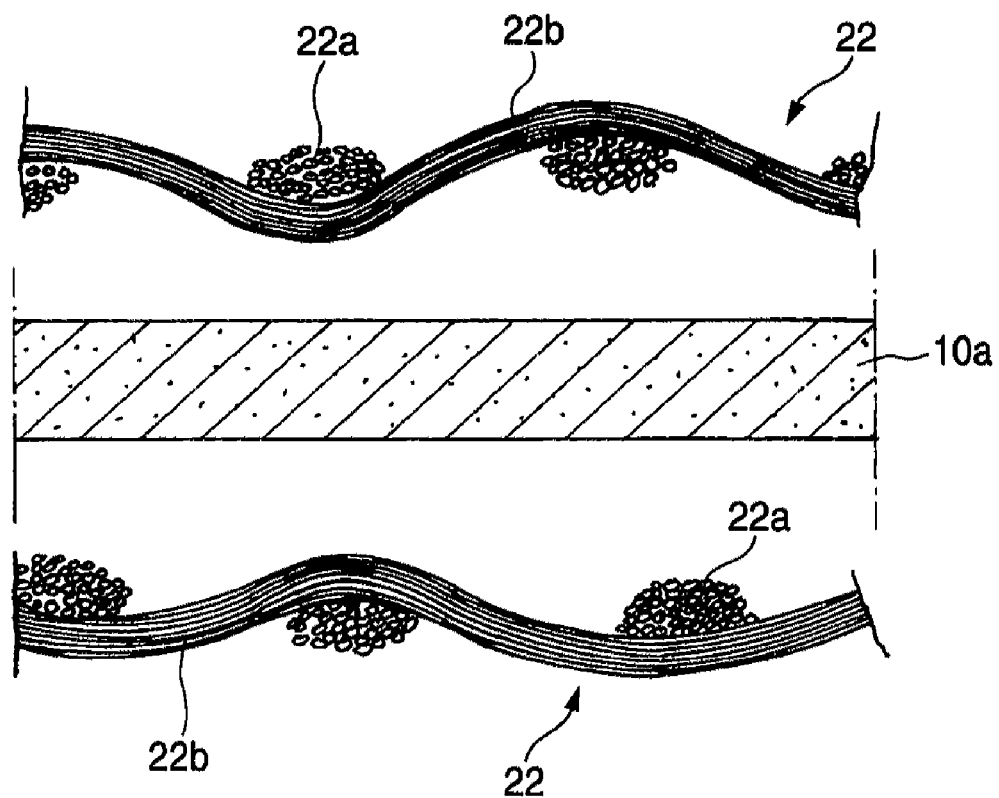
FIG. 2 is a diagram illustrating an example of the process for the production of a solid electrolyte layer shown in FIG. 1.

In order to produce the solid electrolyte layer 10 shown in FIG. 1, a solid electrolyte layer 10 is formed at first. The solid electrolyte layer 10 can be obtained by pressing a fabric 22, 22 made of an organic fiber or metallic fiber against the both sides of a green sheet 10*a* for solid electrolyte made of a solid electrolyte as shown in FIG. 2, peeling the fabric 22, 22 from the green sheet 10*a*, and then calcining the green sheet 10*a* at a predetermined temperature. The solid electrolyte layer 10 shown in FIG. 3A obtained by calcining has two roughened portions having different periods formed on the both sides thereof to have a roughened surface. Among the two roughened portions, the first roughened portion 11*a* having a higher period is formed by the portion between the crossings of warp 22*a* and weft 22*b* constituting the fabric 22. The second roughened portion 11*b* having a lower period formed on the surface of the first roughened portion 11*a* is formed by a single fiber constituting warp 22*a* or weft 22*b*.

Figure 3A:
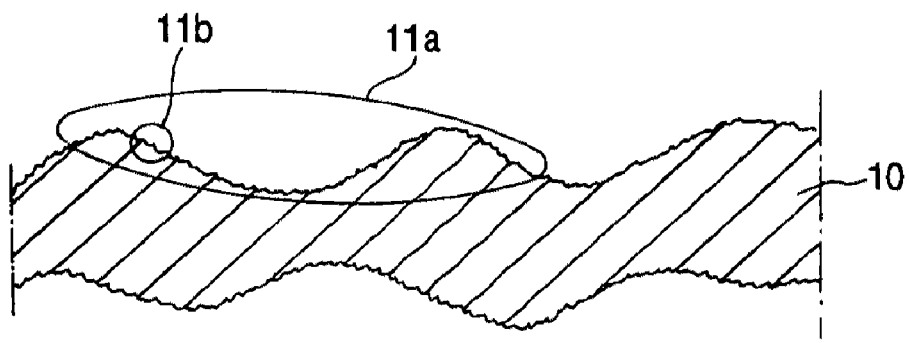
FIGS. 3A and 3B are flow chart illustrating a process for the production of the solid electrolyte fuel cell shown in FIG. 1 from the solid electrolyte layer obtained by the production process shown in FIG. 2.
Figure 3B:
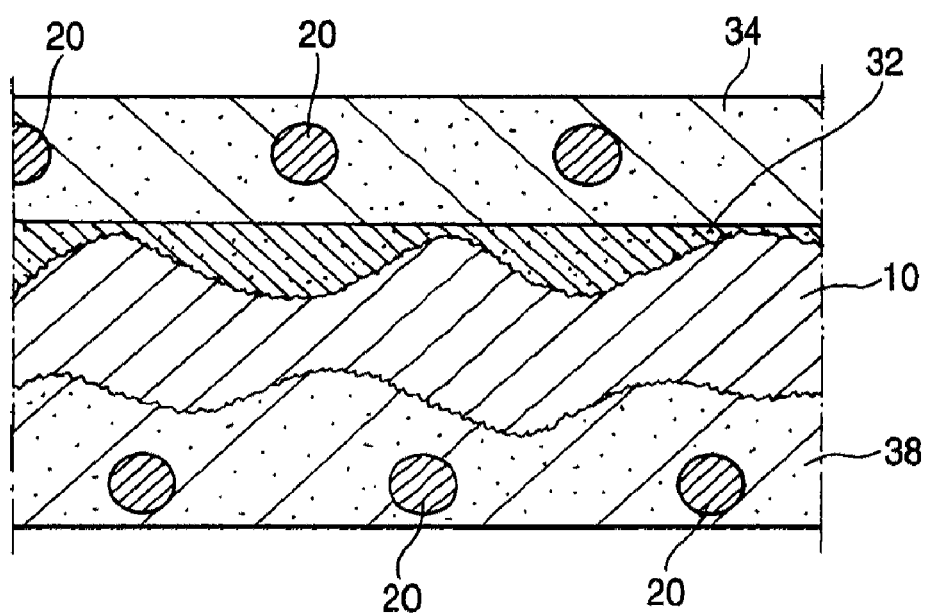

Subsequently, the aforementioned porous layer paste is printed over the first cathode sheet 32 formed by printing the dense layer paste as shown in FIG. 3B to form a second cathode sheet 34 on one side of the solid electrolyte layer 10 shown in FIG. 3A.

Further, the aforementioned anode layer paste is printed over the other side of the solid electrolyte layer 10 to form an anode sheet 38.

The second cathode sheet 34 and the anode sheet 38 each have a mesh metal made of metal wire 20, 20 . . . embedded therein. To the mesh metal is fixed a drawing wire (not shown) by welding.

The mesh metal is embedded in the second cathode sheet 34 in such an arrangement that the metal wire 20, 20 . . . constituting the mesh metal each are disposed above the recessed side of the first roughened portion 11*a* having a highr period of the solid electrolyte layer 10. The mesh metal may be fixed to the surface of the second cathode sheet 34.

Thereafter, the laminate shown in FIG. 3B is calcined at a temperature at which the pore-forming material incorporated in the second cathode sheet 34 can be gasified to obtain the solid electrolyte fuel cell shown in FIG. 1.

In some detail, in the first cathode sheet 32, the portion corresponding to the raised portion of the first roughened portion 11*a* having a higher period formed on the surface of the solid electrolyte layer 10 is thinner than the portion corresponding to the recessed portion of the first roughened portion 11*a*. In this arrangement, the thin portion of the first cathode sheet 32 breaks into a plurality of island-shaped portions 12*a*, 12*a* . . . due to stress caused by thermal expansion or thermal shrinkage of the laminate shown in FIG. 3B. In this manner, the first cathode sheet 32 is calcined while being divided into portions corresponding to the raised portions of the first roughened portion 11*a* having a higher period formed on the surface of the solid electrolyte layer 10. Thus, the island-shaped portions 12*a*, 12*a* . . . can be formed in substantially the same size. The width of the gap between the island-shaped portion 12a and the island-shaped portion 12a can be substantially the same.

Further, the pore-forming material incorporated in the second cathode sheet 34 is gasified to form a second cathode layer 14 which is more porous than the first cathode layer 12. As a result, the solid electrolyte fuel cell shown in FIG. 1 can be obtained.

As previously mentioned, the solid electrolyte fuel cell shown in FIG. 1 is disposed in or in the vicinity of flame on the anode layer 18 side thereof in the open atmosphere. The disposition of the anode layer 18 opposed to flame makes it easy to use also hydrocarbon, hydrogen, radicals (OH, CH, $C_2$, $O_2H$, $CH_3$) present in the flame as fuel.

Further, the surface of the solid electrolyte fuel cell on the cathode layer 16 side thereof can be exposed to the atmosphere, making it easy to use oxygen in the atmosphere. Moreover, a gas containing oxygen (air, oxygen-rich gas, etc.) may be blown against the cathode layer 16 so that the cathode layer 16 can use oxygen efficiently.

Although the solid electrolyte fuel cell is disposed in or in the vicinity of flame as mentioned above, the solid electrolyte fuel cell is preferably disposed in reducing flame, which is the root of flame. The disposition of the solid electrolyte fuel cell in reducing flame makes it possible to use hydrocarbon, hydrogen, radicals, etc. present in reducing flame as fuel. Even when an anode layer 18 made of an electrode material for anode layer which can be easily oxidized and deteriorated is used, the resulting solid electrolyte fuel cell can maintain its durability.

As the fuel there may be used any material which can be combusted and oxidized to generate flame (combustible material).

Figure 4:
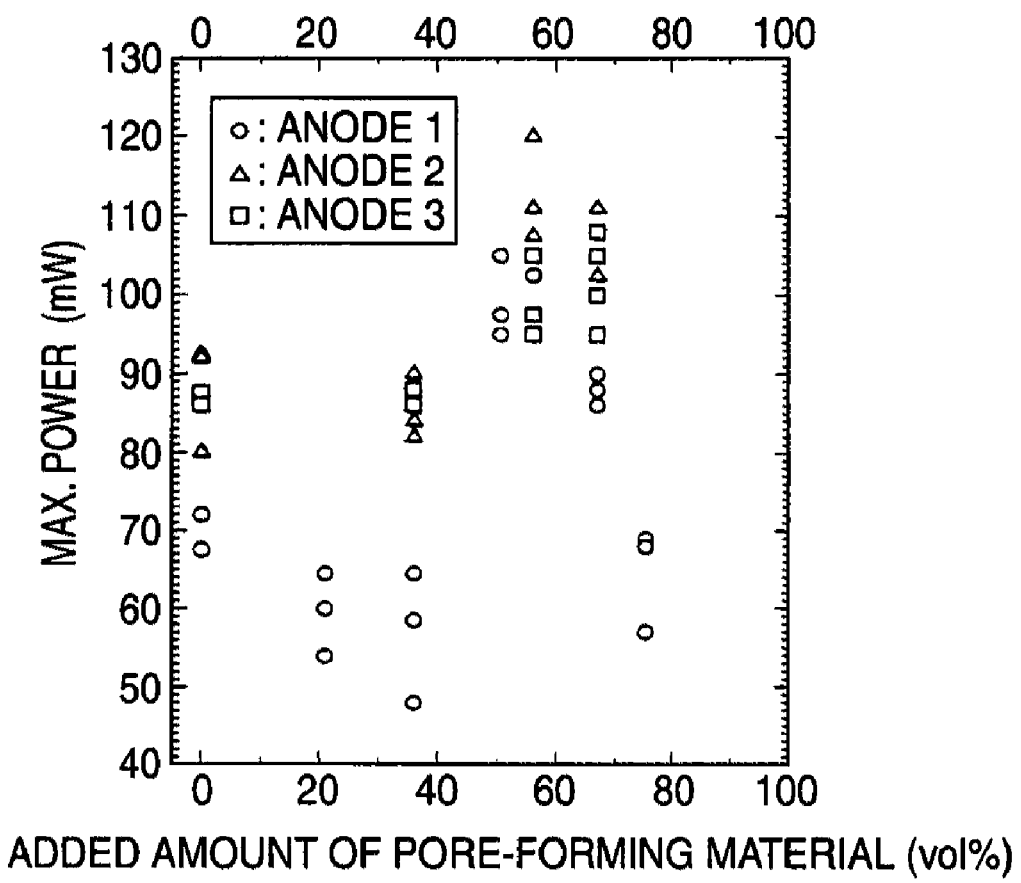
FIG. 4 is a graph illustrating the relationship between the amount of pore-forming material to be incorporated in the porous layer paste constituting the second cathode layer 14 and the electric power of the resulting solid electrolyte fuel cell.

The relationship between the amount of pore-forming material incorporated in the porous layer paste constituting the second cathode sheet 34 shown in FIG. 3 and the electric power of the solid electrolyte fuel cell thus obtained is graphically shown in FIG. 4.

In the graph of FIG. 4, the abscissa indicates the amount of carbon-based pore-forming material incorporated in the porous layer paste and the ordinate indicates the maximum output of the solid electrolyte fuel cell thus obtained. The graph of FIG. 4 depicts the maximum output of solid electrolyte fuel cells obtained from different anode layer electrode materials constituting the anode layer 18.

As can be seen in the graph of FIG. 4, when the amount of pore-forming material incorporated in the porous layer paste is from 50 to 70 vol-%, the maximum output of the solid electrolyte fuel cell thus obtained can be enhanced.

While the foregoing description is made with reference to the case where the second cathode layer 14 and the anode layer 18 each have a mesh metal provided therein, a linear metal may be provided in these layers.

Figure 5:
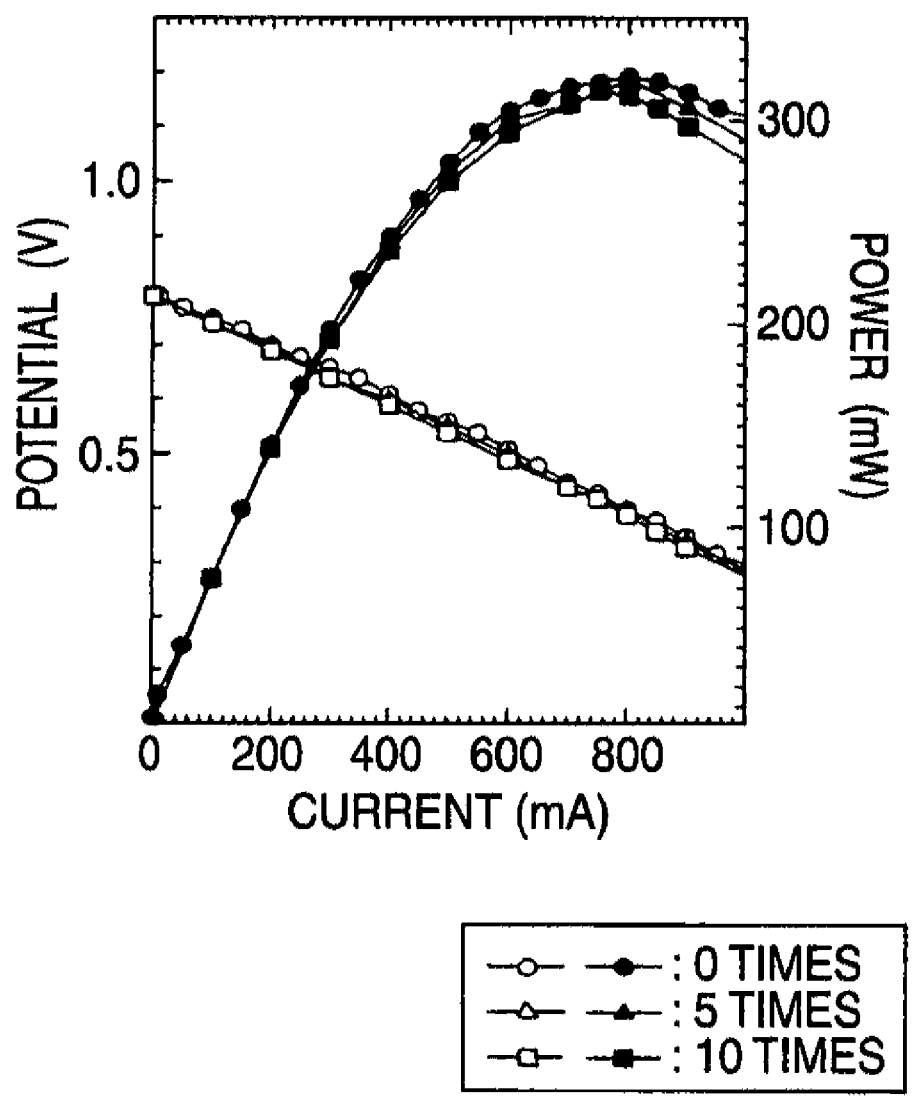
FIG. 5 is a graph illustrating the results of performance deterioration test on the solid electrolyte fuel cell shown in FIG. 1 by thermal shock.

A premixed flame of butane gas as a fuel from a burner is applied to the surface of the solid electrolyte fuel cell shown in FIG. 1 on the anode layer 18 side thereof to examine the electricity-generating properties thereof. Thereafter, the solid electrolyte fuel cell is sufficiently separated from the flame so that the temperature of the entire solid electrolyte fuel cell is returned to room temperature. Thereafter, the premixed flame from a burner is again applied to the solid electrolyte fuel cell on the anode layer 18 side thereof. This procedure is then repeated to subject the solid electrolyte fuel cell to test on performance deterioration by thermal shock. The results are shown in FIG. 5. As can be seen in the electricity-generating properties shown in FIG. 5, the solid electrolyte fuel cell shown in FIG. 1 showed a remarkably reduced drop of electricity-generating properties as compared with the related art solid electrolyte fuel cell shown in FIG. 14 even after 10 repetitions of thermal shock.

In FIG. 5, the circular marks depict electric power (solid mark) and voltage (blank mark) developed after no thermal shock, the triangular marks depict electric power (solid mark) and voltage (blank mark) developed after five repetitions of thermal shock and the rectangular marks depict electric power (solid mark) and voltage (blank mark) developed after ten repetitions of thermal shock.

Figure 6:
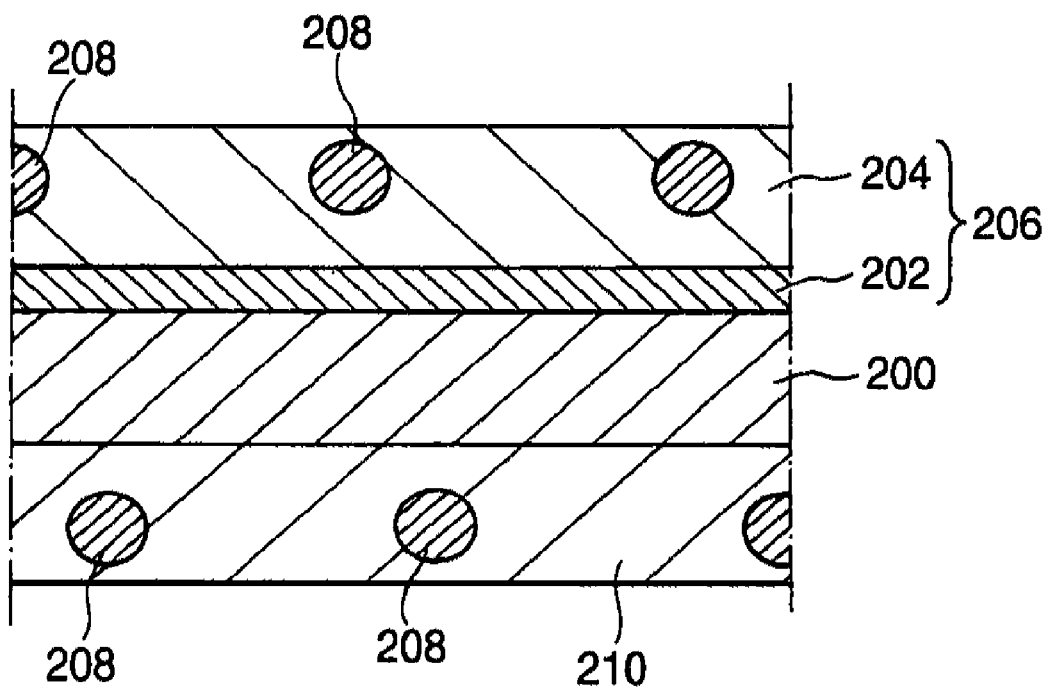
FIG. 6 is a partial sectional view illustrating an example of the comparative solid electrolyte fuel cell.

On the other hand, the solid electrolyte fuel cell shown in FIG. 6 is formed by the same composition as the forming materials constituting the constituents of the solid electrolyte fuel cell shown in FIG. 1. In the solid electrolyte fuel cell of FIG. 6, a solid electrolyte layer 200 both sides of which are flat has a cathode layer 206 laminated on one side thereof and an anode layer 210 laminated on the other side thereof. The cathode layer 206 is a two-layer structure composed of a first cathode layer 202 provided in contact with one side of the solid electrolyte layer 200 and a second cathode layer 204 provided covering the first cathode layer 202. The second cathode layer 204 has a higher porosity than the first cathode layer 202. The first cathode layer 202 has no divisions and is in the form of sheet.

The second cathode layer 204 and the anode layer 210 each have a platinum metal wire 208, 208 . . . constituting a current collecting mesh metal embedded therein.

Figure 7:
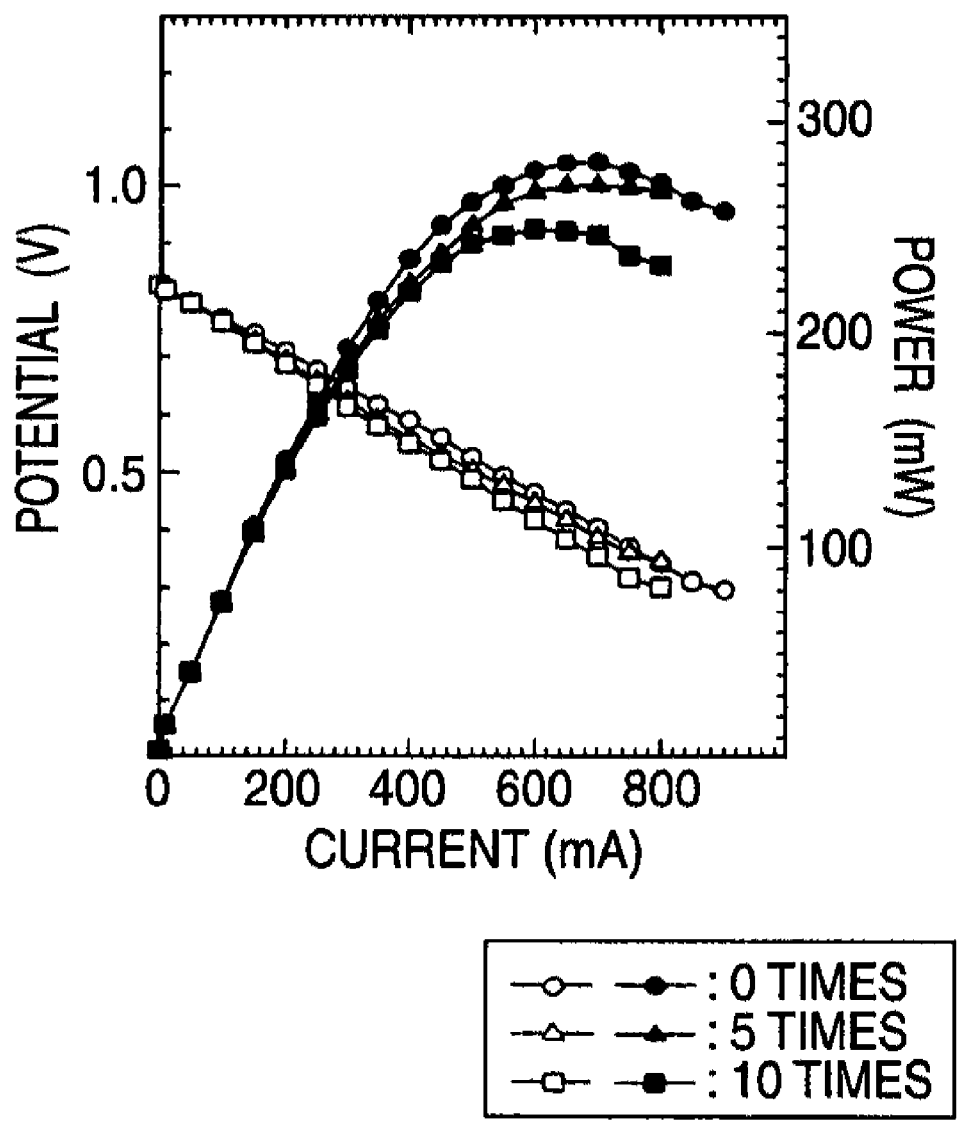
FIG. 7 is a graph illustrating the results of performance deterioration test on the solid electrolyte fuel cell shown in FIG. 6 by thermal shock.

The solid electrolyte fuel cell shown in FIG. 6 is subjected to the same test on performance deterioration by thermal shock as effected above. As a result, electricity-generating properties shown in FIG. 7 are exhibited. As can be seen in the electricity-generating properties shown in FIG. 7, the solid electrolyte fuel cell of FIG. 6 showed a greater deterioration of electricity-generating properties developed after 10 repetitions of thermal shock than the solid electrolyte fuel cell of FIG. 1, the electricity-generating properties of which is shown in FIG. 5.

In FIG. 7, the circular marks depict electric power (solid mark) and voltage (blank mark) developed after no thermal shock, the triangular marks depict electric power (solid mark) and voltage (blank mark) developed after five repetitions of thermal shock and the rectangular marks depict electric power (solid mark) and voltage (blank mark) developed after ten repetitions of thermal shock.

The reason why the solid electrolyte fuel cell shown in FIG. 6 shows a greater drop of electricity-generating properties after 10 repetitions of thermal shock than the solid electrolyte fuel cell shown in FIG. 1 is presumably as follows.

Figure 8A:
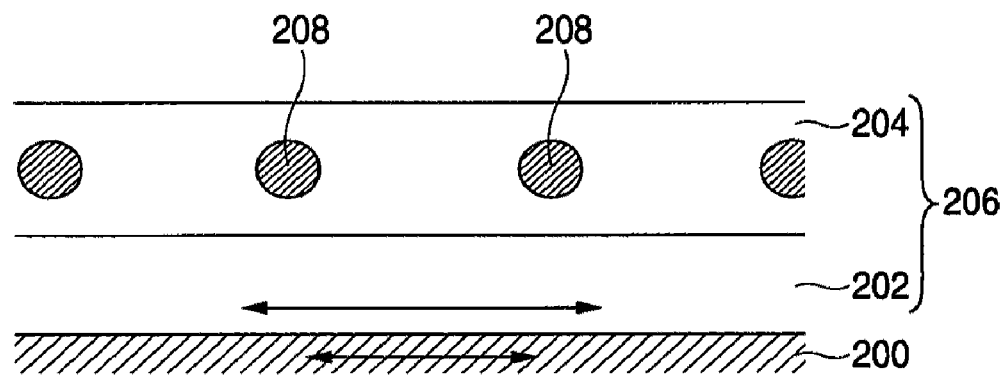
FIGS. 8A and 8B are schematic diagram demonstrating that the solid electrolyte fuel cell shown in FIG. 1 is excellent in durability.

In other words, as shown in FIG. 8A, the first cathode layer 202 provided in contact with one side of the solid electrolyte layer 200 has no divisions. Therefore, when the solid electrolyte fuel cell in the form of sheet undergoes thermal shock, the interface of the solid electrolyte layer 200 with the first cathode layer 202 is given a great stress caused by the difference in thermal expansion coefficient between the two layers. As a result, the site where the solid electrolyte layer 200 and the first cathode layer 202 are bonded with a low adhesion undergoes partial exfoliation.

Figure 8B:
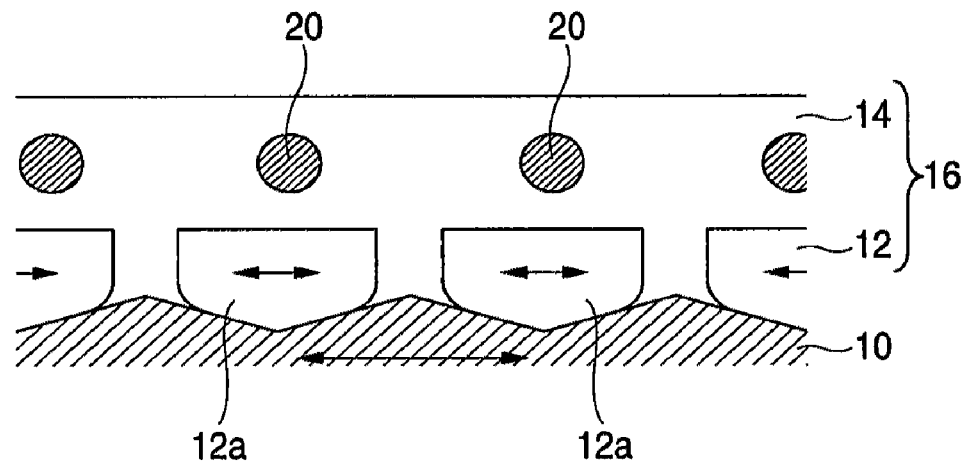

On the other hand, as shown in FIG. 8B, in the case where the first cathode layer 12 provided in contact with one side of the solid electrolyte layer 10 has a plurality of island-shaped divisions 12a, 12a . . . , when the solid electrolyte fuel cell undergoes thermal shock, the interface of the solid electrolyte layer 10 with the island-shaped portions 12a, 12a . . . constituting the first cathode layer 12 undergoes dispersion of stress caused by the difference in thermal expansion coefficient between the two layers. As a result, the exfoliation of the solid electrolyte layer 10 and the island-shaped portions 12a, 12a . . . constituting the first cathode layer 12 from each other can be prevented.

As can be seen in the electricity-generating properties shown in FIG. 5, the solid electrolyte fuel cell shown in FIG. 1 is found to have some drop of electricity-generating properties after 10 repetitions of thermal shock. The inventors presumes that the some drop of electricity-generating properties is attributed to the simultaneous calcining of the first cathode sheet 32 and the second cathode sheet 34. The inventors then make a study of sequential calcining of the first cathode sheet 32 and the second cathode sheet 34.

Figure 9A:
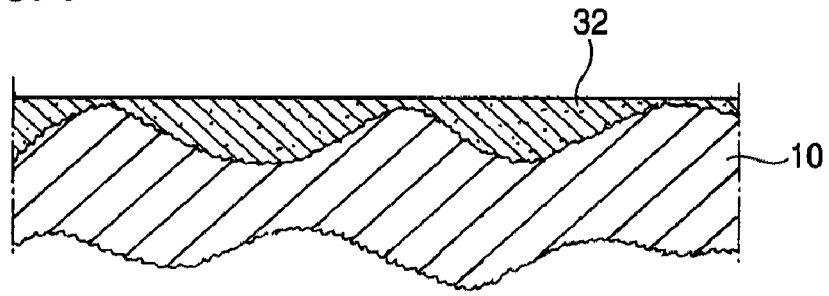
FIGS. 9A to 9C are flow chart illustrating another example of the process for the production of the solid electrolyte fuel cell shown in FIG. 1.
Figure 9B:
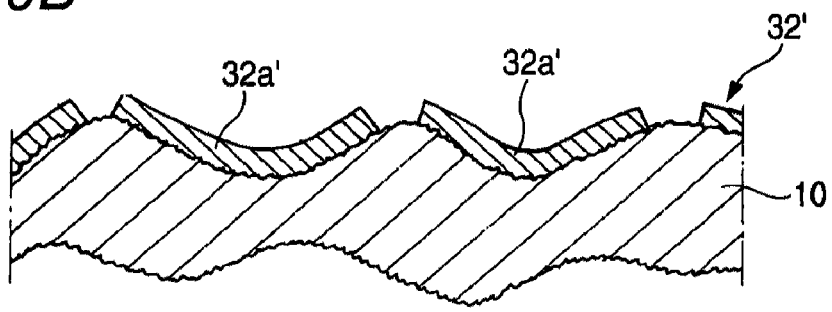

Firstly, as shown in FIG. 9A, the inventors print the dense layer paste previously mentioned over one side of the solid electrolyte layer 10 to form a first cathode sheet 32. The first cathode sheet 32 is then tentatively calcined to form a tentatively calcined material 32'. During the tentative calcining, the thin portion of the first cathode sheet 32 breaks into a plurality of island-shaped portions 32'a, 32'a . . . due to stress caused by the resulting thermal expansion or thermal shrinkage as shown in FIG. 9B.

Figure 9C:
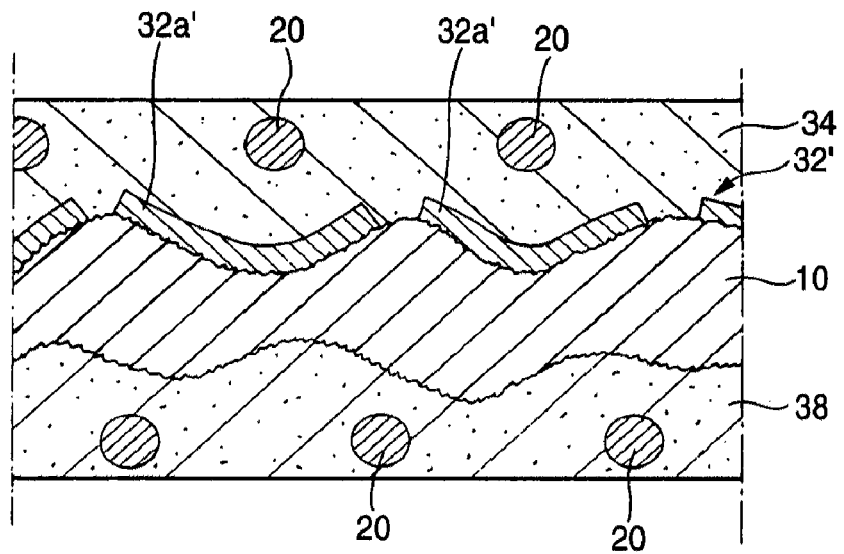

Subsequently, as shown in FIG. 9C, the porous layer paste previously mentioned is printed over the tentatively calcined material 32' to form a second cathode sheet 34. At the same time, the anode layer paste previously mentioned is printed over the other side of the solid electrolyte layer 10 to form an anode sheet 38.

The second cathode sheet 34 and the anode sheet 38 each have a mesh metal made of metal wire 20, 20 . . . embedded therein. To the mesh metal is fixed a drawing wire (not shown) by welding.

The mesh metal is embedded in the second cathode sheet 34 in such an arrangement that the metal wire 20, 20 . . . each are disposed above the island-shaped portions 32+a constituting the tentatively calcined material 32'. The mesh metal may be fixed to the surface of the second cathode sheet 34.

Thereafter, the laminate shown in FIG. 9C is calcined to cause the gap between the island-shaped portions 12a constituting the first cathode layer to be filled with the material constituting the second cathode layer 14.

Owing to this, it is possible to effectively use the spaces between the island-shaped portions 12a.

Figure 10:
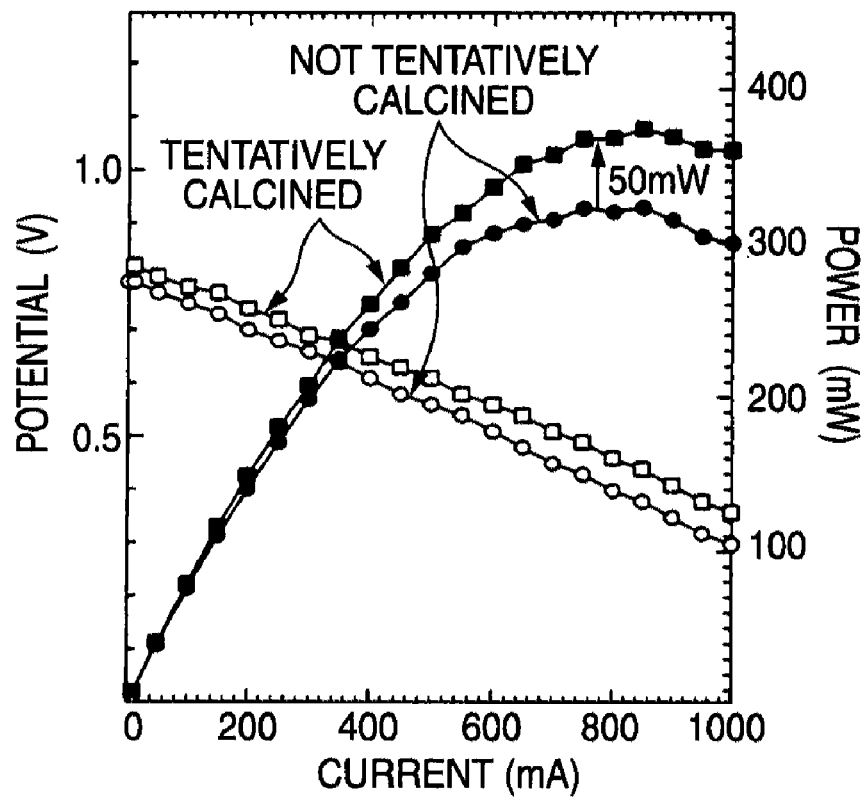
FIG. 10 is a graph illustrating the electricity-generating properties of the solid electrolyte fuel cell obtained by the production process shown in FIG. 9.

A premixed flame of butane gas as a fuel from a burner is applied to the surface of the solid electrolyte fuel cell thus obtained on the anode layer side thereof to examine the electricity-generating properties thereof. The results are shown in FIG. 10. As can be seen in the electricity-generating properties shown in FIG. 10, the solid electrolyte fuel cell obtained by subjecting the first cathode sheet 32 formed on one side of the solid electrolyte layer 10 to tentative calcining exhibits enhanced electricity-generating properties as compared with the solid electrolyte fuel cell obtained without subjecting the first cathode sheet 32 to tentative calcining.

In FIG. 10, the circular marks each indicate the product obtained without tentative calcining (solid mark: electric power) and the rectangular marks each indicate the product obtained by tentative calcining (blank mark: voltage (potential)).

Figure 11:
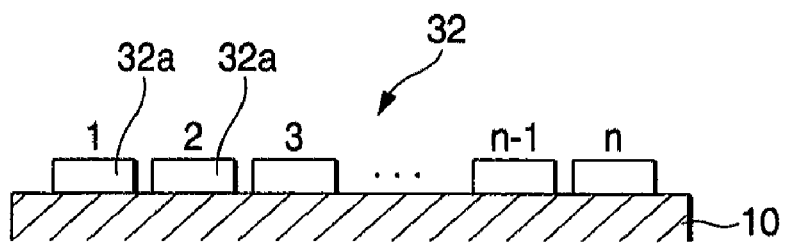
FIG. 11 is a partial sectional view illustrating another method for forming the second cathode layer 12.

While the solid electrolyte fuel cells of FIGS. 1 to 10 described above each are obtained in such a manner that the first roughened surface formed on one side of the solid electrolyte layer 10 is made the use of to form the first cathode layer 12 having a plurality of island-shaped divisions 12a, 12a . . . during the calcining, a first cathode sheet 32 which has been previously divided into island-shaped portions 32a, 32a . . . may be formed on one side of a flat solid electrolyte layer 10 as shown in FIG. 11. The first cathode sheet 32 which has been previously divided into island-shaped portions 32a, 32a . . . can be obtained by screen-printing a dense layer paste over one side of the flat solid electrolyte layer 10.

While the solid electrolyte fuel cells shown in FIGS. 1 to 10 each comprise a solid electrolyte layer 10 the both sides of which have two roughened portions having different periods to have a roughened surface as a solid electrolyte layer, a solid electrolyte layer one side of which have only a first roughened portion having a high period to have a roughened surface may be used. This solid electrolyte layer can be formed by pressing a mask sheet having raised portions at a predetermined interval against one side of the solid electrolyte green sheet 10a.

Example 1

(1) Preparation of Solid Electrolyte Fuel Cell

In order to prepare a solid electrolyte layer 10, a plain weave fabric 22, 22 is pressed against the both sides of a solid electrolyte green sheet formed by doctor blade method using a hydraulic press at a pressure of 150 kg/cm$^2$. The fabric 22, 22 is then peeled off the both sides of the green sheet. The both sides of the solid electrolyte green sheet thus peeled are then observed. As a result, it is found that a periodic checkerboard-like first roughened portion is formed. It is also found that the first roughened portion had a low period second roughened portion formed thereon made of a single fiber constituting the fabric 22, 22.

The solid electrolyte green sheet is stamped into a circular form which is then calcined at 1,300° C. to obtain a ceramic substrate made of $Sm_{0.2}Ce_{0.8}O_{1.9}$ (samaria-doped ceria: SDC) having a thickness of 180 μm and a diameter φ of 15 mm.

A dense layer paste made of $Sm_{0.5}Sr_{0.5}CoO_3$ (samarium strontium cobaltite: SSC) having SDC incorporated therein in an amount of 50 wt-% is then sheet-printed (printed area: 1.3 cm$^2$) as a first cathode sheet 32 constituting the first cathode layer 12 over one side (area: 1.8 cm$^2$) of the ceramic substrate thus obtained as solid electrolyte layer 10.

Further, an anode layer paste obtained by mixing 20 wt-% of SDC, 5 wt-% of $Rh_2O_3$ (rhodium oxide) and 8 mol-% of Li—$NiO_2$ is sheet-printed as an anode sheet 38 constituting the anode layer 18 on the other side of the ceramic substrate (printed area: 1.3 cm$^2$).

Moreover, a porous layer paste made of SSC having 55 vol-% of a carbon-based pore-forming material and 30 wt-% of SDC incorporated therein is sheet-printed as a second cathode sheet 34 constituting the second cathode layer 14 over the first cathode sheet 32 (printed area: 1.3 cm$^2$).

Subsequently, a mesh metal gauge (#80; distance between metal wires: 320 μm) formed by welding platinum wire is embedded in the second cathode sheet 34 and the anode sheet 38. The laminate is then calcined at 1,200° C. in the atmosphere for 1 hour to obtain a solid electrolyte fuel cell.

(2) Observation of Section

Figure 12:
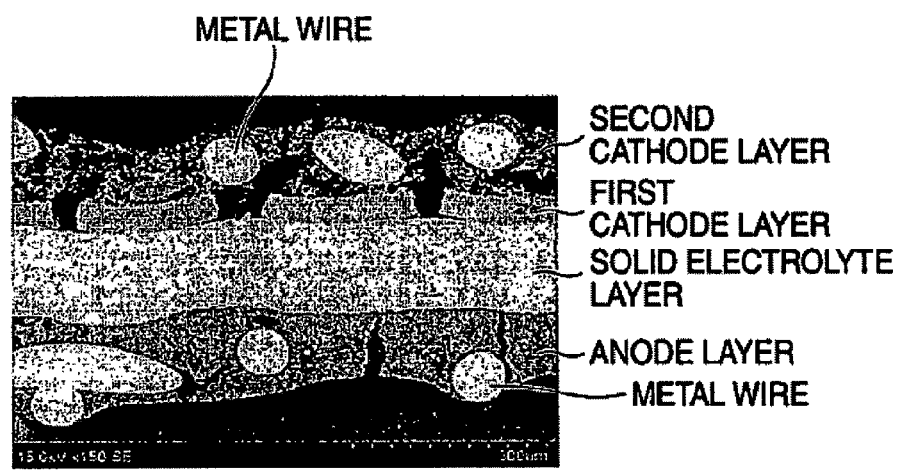
FIG. 12 is an electron microphotograph of a section of the solid electrolyte fuel cell obtained in Example 1.

An electron microphotograph of a section of the solid electrolyte fuel cell thus obtained is shown in FIG. 12. As can be seen in the electron microphotograph shown in FIG. 12, a first cathode layer having a plurality of island-shaped divisions is formed on one side of the solid electrolyte layer having a first roughened portion having a period of 300 μm formed on the both sides thereof. The first cathode layer is covered by the second cathode layer. (The first cathode layer has a second roughened portion having a lower period than the first roughened portion formed on the surface thereof, but this is not definitely shown in the electron microphotograph shown in FIG. 12.)

The island-shaped portions of the first cathode layer are each disposed on the recessed portion of the roughened portions of the solid electrolyte layer. The gap between the island-shaped portions is disposed in the raised portion of the first roughened portions of the solid electrolyte layer.

Further, the metal wire of mesh metal gauge is disposed above the island-shaped portions of the first cathode layer wrapped by the forming material constituting the second cathode layer.

The length of the island-shaped portions of the first cathode layer is from 100 μm to 300 μm and the gap between the island-shaped portions is from 10 μm to 100 μm.

(3) Electricity-Generating Properties

A premixed flame of butane gas as a fuel from a 6.5% burner is applied to the surface of the solid electrolyte fuel cell thus obtained on the anode layer side thereof to examine the electricity-generating properties thereof. Thereafter, the solid electrolyte fuel cell is sufficiently separated from the flame so that the temperature of the entire solid electrolyte fuel cell is returned to room temperature. Thereafter, the premixed flame from a burner is again applied to the solid electrolyte fuel cell on the anode layer 18 side thereof. This procedure is then repeated ten times to subject the solid electrolyte fuel cell to test on performance deterioration by thermal shock. The results are shown in FIG. 5.

As can be seen in the electricity-generating properties shown in FIG. 5, the solid electrolyte fuel cell showed little or no deterioration of electricity-generating properties even after 10 repetitions of thermal shock.

Comparative Example 1

The procedure of Example 1 is followed except that the solid electrolyte green sheet is calcined without pressing fabric 22, 22 against the both sides thereof to form a solid electrolyte layer both sides of which are flat and the cathode layer 16 is formed only by the first cathode layer 12 (dense layer). Thus, a solid electrolyte fuel cell shown in FIG. 13 is prepared.

Figure 13:
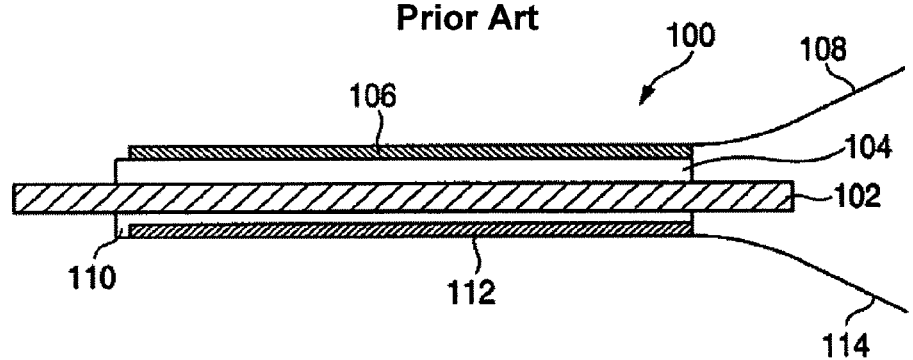
FIG. 13 is a sectional view illustrating the related art solid electrolyte fuel cell.

The solid electrolyte fuel cell of FIG. 13 thus obtained is then subjected to the same thermal shock test as effected in Example 1. The results are shown in FIG. 14.

Figure 14:
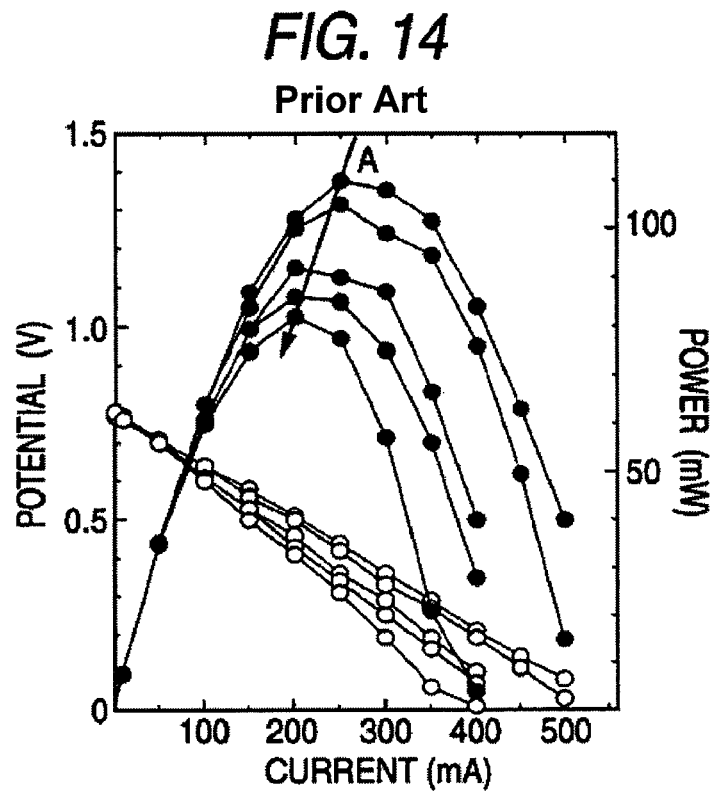
FIG. 14 is a graph illustrating the results of performance deterioration test on the solid electrolyte fuel cell shown in FIG. 13 by thermal shock.
Figure 15:
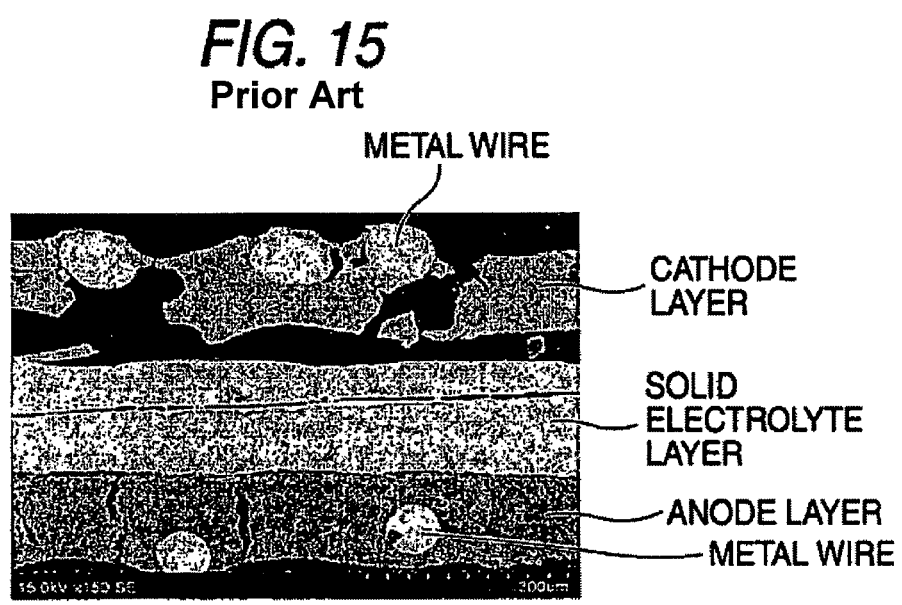
FIG. 15 is an electron microphotograph of a section of the solid electrolyte fuel cell shown in FIG. 13 after performance deterioration test by thermal shock.

As can be seen in the electricity-generating properties shown in FIG. 14, the solid electrolyte fuel cell showed some deterioration of electricity-generating properties every thermal shock. In FIG. 14, this phenomenon is shown by the arrow A indicating the direction of drop of electric power.

Comparative Example 2

The procedure of Example 1 is followed except that the solid electrolyte green sheet is calcined without pressing fabric 22, 22 against the both sides thereof to form a solid electrolyte layer both sides of which are flat. Thus, a solid electrolyte fuel cell shown in FIG. 6 is prepared.

The solid electrolyte fuel cell of FIG. 6 thus obtained is then subjected to the same thermal shock test as effected in Example 1. The results are shown in FIG. 7.

As can be seen in the electricity-generating properties shown in FIG. 7, the solid electrolyte fuel cell shown in FIG. 6 showed a definite deterioration of electricity-generating properties after 10 repetitions of thermal shock.

Example 2

(1) Preparation of Solid Electrolyte Fuel Cell

In order to prepare a solid electrolyte layer 10, a plain weave fabric 22, 22 is pressed against the both sides of a solid electrolyte green sheet formed by doctor blade method using a hydraulic press at a pressure of 150 kg/cm$^2$. The fabric 22, 22 is then peeled off the both sides of the green sheet. The both sides of the solid electrolyte green sheet thus peeled are then observed. As a result, it is found that a periodic checkerboard-like first roughened portion is formed. It is also found that the first roughened portion has a low period second roughened portion formed thereon made of a single fiber constituting the fabric 22, 22.

The solid electrolyte green sheet is stamped into a circular form which is then calcined at 1,300° C. to obtain a ceramic substrate made of $Sm_{0.2}Ce_{0.8}O_{1.9}$ (samaria-doped ceria: SDC) having a thickness of 180 μm and a diameter φ of 15 mm.

A dense layer paste made of $Sm_{0.5}Sr_{0.5}CoO_3$ (samarium strontium cobaltite: SSC) having SDC incorporated therein in an amount of 50 wt-% is then sheet-printed (printed area: 1.3 cm$^2$) as a first cathode sheet 32 constituting the first cathode layer 12 constituting the cathode layer 16 over one side (area: 1.8 cm$^2$) of the ceramic substrate thus obtained as solid electrolyte layer 10.

The first cathode sheet 32 thus obtained is subjected to tentative calcining at a temperature of 1,200° C. for 1 hour to form a tentatively calcined material 32'. An anode layer paste obtained by mixing 20 wt-% of SDC, 5 wt-% of $Rh_2O_3$ (rhodium oxide) and 8 mol-% of Li—$NiO_2$ is sheet-printed as an anode sheet 38 constituting the anode layer 18 on the other side of the ceramic substrate (printed area: 1.3 cm$^2$).

Moreover, a porous layer paste made of SSC having 55 vol-% of a carbon-based pore-forming material and 30 wt-% of SDC incorporated therein is sheet-printed as a second cathode sheet 34 constituting the second sheet 14 constituting the cathode layer 16 over the tentatively calcined material 32' (printed area: 1.3 cm$^2$)

Subsequently, a mesh metal gauge (#80; distance between metal wires: 320 μm) formed by welding platinum wire is embedded in the second cathode sheet 34 and the anode sheet 38. The laminate is then calcined at 1,200° C. in the atmosphere for 1 hour to obtain a solid electrolyte fuel cell.

(2) Observation of Section

The solid electrolyte fuel cell obtained in the present example shows substantially the same section as that of the solid electrolyte fuel cell obtained in Example 1 shown in FIG. 12.

As can be seen in the section shown in FIG. 12, however, the solid electrolyte fuel cell obtained in the present example is observed to have little or no space between the island-shaped portions constituting the first cathode layer.

(3) Electricity-Generating Properties

A premixed flame of butane gas as a fuel from a 6.5% burner is applied to the surface of the solid electrolyte fuel cell thus obtained on the anode layer side thereof to examine the electricity-generating properties thereof. The results are shown in FIG. 10. FIG. 10 also depicts the electricity-generating properties of the solid electrolyte fuel cell obtained in Example 1 as an example of the results of the "product obtained without tentative calcining".

As can be seen in the electricity-generating properties shown in FIG. 10, the solid electrolyte fuel cell exhibits better electricity-generating properties than the solid electrolyte fuel cell obtained in Example 1.

What is claimed is:
1. A solid electrolyte fuel cell comprising:
a solid electrolyte layer,
a cathode layer formed on one side of the solid electrolyte layer, and an anode layer formed on an other side of the solid electrolyte layer, wherein the cathode layer includes a first cathode layer formed in contact with the solid electrolyte layer and a second cathode layer formed covering the first cathode layer, the second cathode layer has a higher porosity than the first cathode layer, the first cathode layer is divided into a plurality of island-shaped portions, and the one side and the other side of the solid electrolyte layer includes an impression of a fabric, the one side of the solid electrolyte layer has a first roughened portion that includes a recessed portion on which one of the plurality of island-shaped portions is disposed and a raised portion forming a gap between adjacent ones of the plurality of island-shaped portions, and the one side of the solid electrolyte layer has a second roughened portion having a lower period than the first roughened portion and formed on the first roughened portion.

2. The solid electrolyte fuel cell as defined in claim 1, wherein the plurality of island-shaped portions constituting the first cathode layer are periodically formed.

3. The solid electrolyte fuel cell as defined in claim 1, wherein the gap between the plurality of island-shaped portions of the first cathode layer is filled with a molding material constituting the second cathode layer.

4. The solid electrolyte fuel cell as defined in claim 1, wherein the surface of the solid electrolyte layer on the cathode layer side thereof is periodically roughened to have a roughened surface, the roughened portion has the island-shaped portions constituting the first cathode layer disposed on the recessed side thereof and the gap between the island-shaped portions disposed on the raised side thereof.

5. The solid electrolyte fuel cell as defined in claim 1, wherein the recessed portion and the raised portion occur in turn periodically.

6. The solid electrolyte fuel cell as defined in claim 1, wherein a metal wire constituting a current collecting mesh metal or linear metal embedded in or fixed to the second cathode layer is provided for each of the island-shaped portions constituting the first cathode layer.

7. The solid electrolyte fuel cell as defined in claim 1, wherein the porosity of the first cathode layer is 10 vol-% or less, and the porosity of the second cathode layer is 50 vol-% or more.

8. The solid electrolyte fuel cell as defined in claim 1, wherein the second cathode layer is a porous layer obtained by adding a pore-forming material gasified at the calcining temperature of the cathode layer during the calcining thereof, and the first cathode layer is a dense layer obtained by calcining without adding the pore-forming material.

9. The solid electrolyte fuel cell as defined in claim 8, wherein the added amount of the pore-forming material is from 50 to 70 vol-%.

10. The solid electrolyte fuel cell as defined in claim 1, wherein the first cathode layer and the second cathode layer each comprise an electrolyte constituting the solid electrolyte layer and an electrode material incorporated therein in admixture.

11. The solid electrolyte fuel cell as defined in claim 10, wherein the first cathode layer has a higher mixing proportion of solid electrolyte than the second cathode layer.

12. The solid electrolyte fuel cell as defined in claim 1, wherein when the solid electrolyte fuel cell is exposed to flame on one side thereof in the open atmosphere to generate electricity, the solid electrolyte fuel cell is exposed to flame on the anode layer side thereof and open to the atmosphere on the cathode layer side thereof.

13. The solid electrolyte fuel cell as defined in claim 1, wherein the first roughened portion includes a shape of a warp and a weft constituting the fabric and the second roughened portion includes a shape of a fiber constituting the warp or the weft.

* * * * *